Nov. 14, 1933.  E. E. BROWN  1,935,390
FLEXIBLE COUPLING
Filed Aug. 7, 1931   2 Sheets-Sheet 1
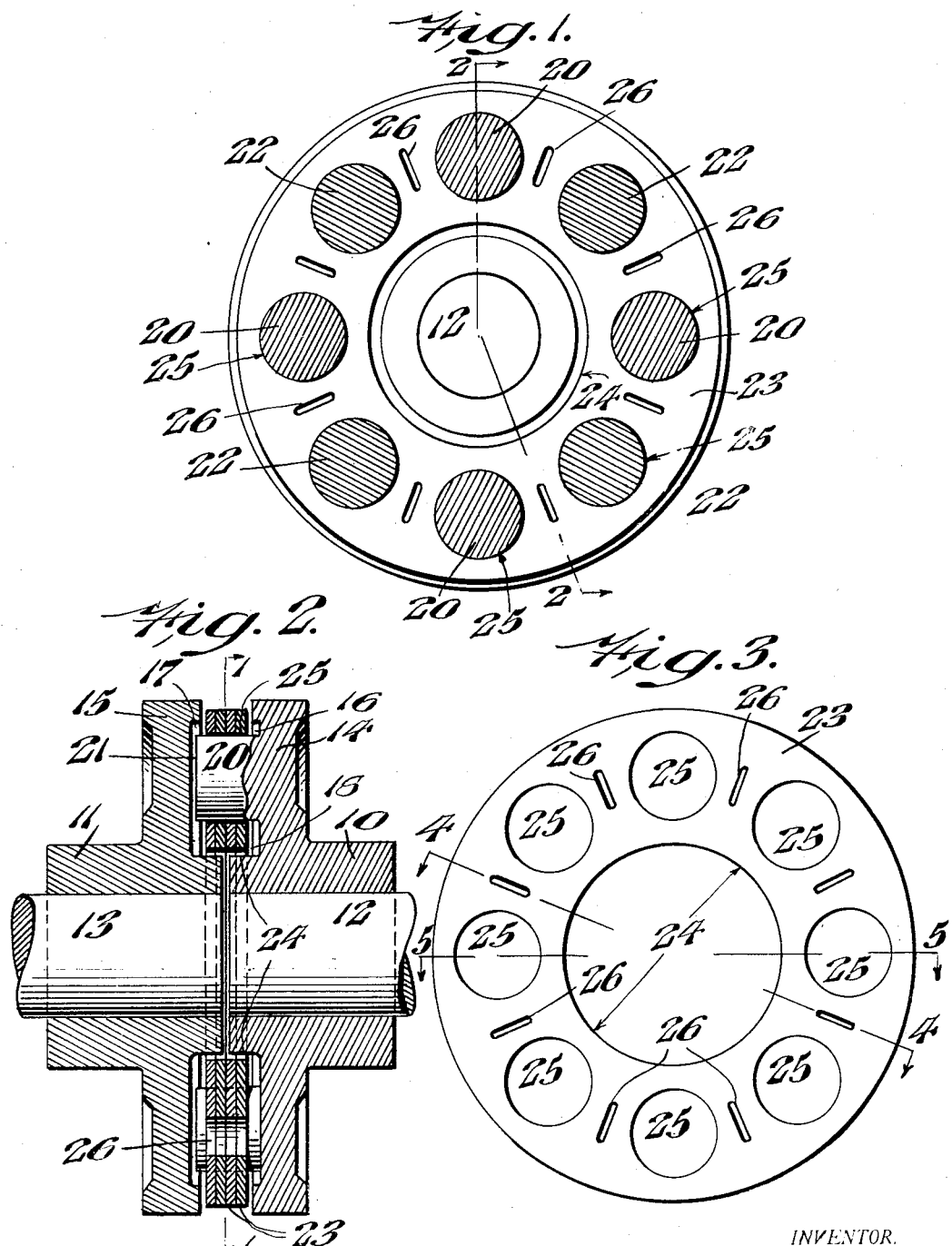
INVENTOR.
Ellis E. Brown.
BY
ATTORNEY.

Nov. 14, 1933.   E. E. BROWN   1,935,390
FLEXIBLE COUPLING
Filed Aug. 7, 1931   2 Sheets-Sheet 2
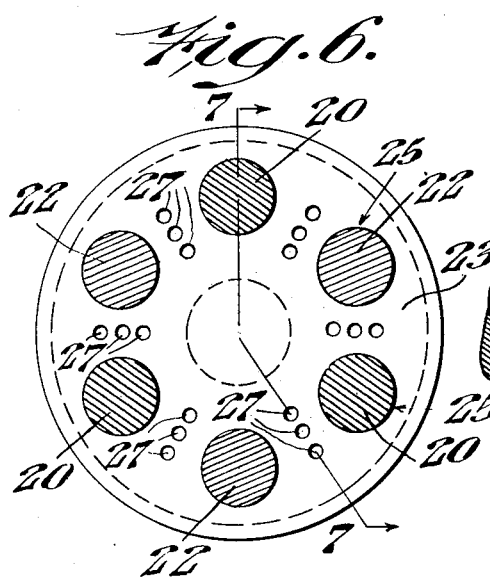
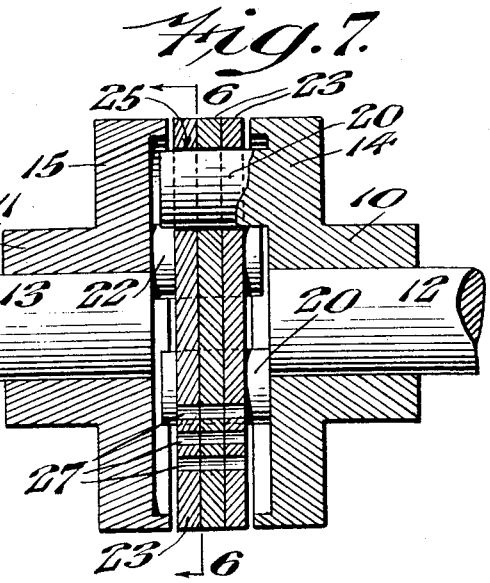
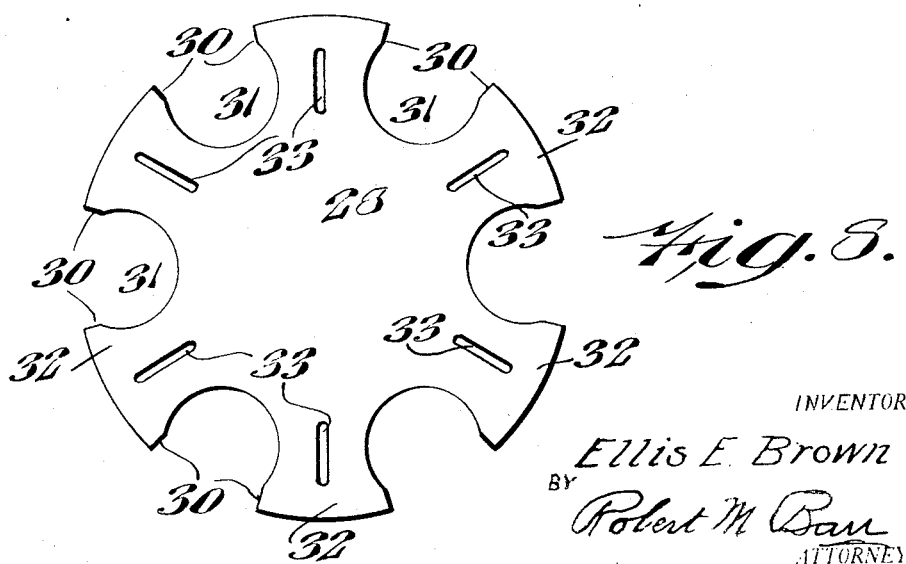
INVENTOR.
Ellis E. Brown
BY Robert M. Barr
ATTORNEY Patented Nov. 14, 1933

1,935,390

UNITED STATES PATENT OFFICE 1,935,390

FLEXIBLE COUPLING

Ellis E. Brown, West Lawn, Pa.

Application August 7, 1931. Serial No. 555,648

7 Claims. (Cl. 64—96)

The present invention relates generally to couplings, and more particularly to the type of coupling which has a degree of flexibility.

In flexible couplings as heretofore constructed it is the general practice to provide two flanged hubs for mounting respectively upon the driving and driven shafts and interconnecting the two flanges by rigid clamping elements which in passing from one flange to the other traverse a disc of flexible material. Such a construction while answering in some particulars the requirements of a flexible coupling has many disadvantages, among which may be mentioned a very restrictive field of operation where the two shafts are not in exact co-axial alinement; the presence of relative movement between parts to cause wear and relatively short life; the damaging effects due to stresses caused by sudden applications of torque; and the stretching of the material of the flexible element beyond its factor of resistance.

Some of the objects of the present invention are to provide an improved flexible coupling for joining the meeting ends of two shafts; to provide an efficient coupling of the flexible type wherein the use of rigid clamping members is entirely dispensed with; to provide a flexible coupling wherein longer life and greater flexibility are obtained without the use of mechanical fastenings; to provide a coupling construction wherein a reserve or supplemental flexibility is an inherent part of the construction which functions to automatically correct misalinement of shafts and particularly parallel misalinement; to provide a flexible coupling capable of effectively absorbing shock loads caused by suddenly applied or reversing loads; to provide a coupling construction which automatically compensates for misalinement of shafts without introducing loss of efficiency, undue wear, or excessive stresses or strains; and to provide other improvements as will hereinafter appear.

In the accompanying drawings, Fig. 1 represents a sectional elevation of a coupling embodying one form of the invention, the section being taken on line 1—1 of Fig. 2; Fig. 2 represents a section on line 2—2 of Fig. 1; Fig. 3 represents a side elevation of one form of flexible disc embodying the present invention; Fig. 4 represents a section of line 4—4 of Fig. 3; Fig. 5 represents a section on line 5—5 of Fig. 3; Fig. 6 represents a sectional elevation of a coupling embodying another form of the invention, the section being taken on line 6—6 of Fig. 7; Fig. 7 represents a section on line 7—7 of Fig. 6; and Fig. 8 represents a side elevation of a modified form of flexible disc.

Referring to the drawings one form of the present invention consists of two hubs 10 and 11 which are respectively arranged to be fixedly attached to driving and driven shafts 12 and 13. The attachment of these parts to their respective shafts may be by means of keys, set bolts, or any other well known means for the purpose and which need not here be illustrated. The hub 10 is provided with an integral flange 14 disposed in a plane normal to and transversely of the shaft 12. Likewise the hub 11 is provided with a similarly arranged flange 15 and the dimensions and construction are such that the two flanges 14 and 15 when assembled upon the respective shafts 12 and 13 lie parallel to each other in spaced relation. This spacing of the flanges is allowed for by locating each flange intermediate the length of its hub and also by the formation of annular grooves 16 and 17 in the respective faces of the aforesaid flanges 14 and 15. In this connection it should be noted that each of the grooves 16 and 17 is concentric with respect to the axis of the shafts 12 and 13 and is radially spaced from said axis a less distance than the radius of the hub proper therefrom. This latter construction forms the relatively large clearance space 18 which encircles the meeting ends of the two shafts and provides for the reception of certain parts which are hereinafter to be described.

For the purpose of transmitting the driving torque from the shaft 12 through hub 10 and flange 14 to the flange 15, the flange 14, in the present instance, is provided with four laterally projecting lugs 20 which are preferably integral with the flange 14 and all of a length sufficient to substantially bridge the space between the two flanges 14 and 15 though allowing sufficient clearance 21 to permit proper flexing movement. Similarly like lugs 22 are formed upon the face of the flange 15 preferably the same radial distance from the axis of rotation as are the lugs 20 and which lugs 22 are so spaced apart as to interfit in spaced relation with the lugs 20 upon the complemental flange 14. As shown in the drawings by way of example the four lugs 22 of the flange 15, in assembled condition, are located equally spaced from and between the respective lugs 20 of the flange 14, all of which will be readily seen from Fig. 1 of the drawings. The motion of the driving force is transmitted through the flange 14 and its lugs 20 to the lugs 22 of the driven flange 15 by an annular disc 23 formed of suitable flexible material such as leather, fabric, or any other material capable of a degree of flexibility and having the desired strength characteristics. In the preferred form this disc 23 is of laminated construction and comprises a plurality of ring elements arranged in face to face relation and having a central opening 24 to allow for the reception of the meeting ends of the two hubs 10 and 11. By reference to Fig. 3 of the drawings it will be seen that this disc 23 has a diameter of sufficient proportions to provide a substantial area for the reception of the respective lugs 20 and 22, this latter being accomplished by the provision of a plurality of lug receiving holes 25 all of which are the same radial distance from the axis of rotation as are the lugs 20 and 22 and which are circumferentially spaced in order to correspond to the spacing of the lugs 20 and 22. The thickness of the disc 23 is preferably less than the distance between the opposed faces of the flanges 14 and 15 so that side clearances are provided which enable one flange part with its lugs to distort with respect to the other flange part without binding or causing improper relative movement between the parts. It will thus be evident, when the disc 23 is in its assembled condition between the flanges 14 and 15 and with the two sets of lugs 20 and 22 seated in the respective openings 25, that motion of the hub 10 will be transmitted directly from the lugs 20 through the flexible disc 23 to the lugs 22 and thus cause a corresponding movement of the hub 11. In the preferred form of the invention and which is the form having been found to give satisfactory results in practical use the lugs 20 and 22 seat snugly in their respective disc openings 25 so that there is a positive movement from one part to the other without lost motion. It will thus be evident while the drive is a positive one from the one side of the coupling to the other that there is an element of flexibility introduced by the disc 13 which will permit within certain limitations a flexing of one shaft and its parts with respect to the other without interfering with the transmitted torque, this of course being due to the inherent flexibility of the disc material bounding the lugs.

As a means for causing the coupling to absorb shock loads, such for example as those suddenly applied or as happen when reversing, the disc 23 is provided with a plurality of radially arranged slots 26, each of which is cut through the material between two of the openings 25, and in the illustrated form of the invention each slot is medially disposed between a pair of slots 25 and has its center approximately the some radial distance from the axis of rotation as the center of the aforesaid openings 25. Preferably each slot 26 is relatively long and narrow since an essential characteristic is that a space be provided through the disc and intercepting the lines of torque force so that under actual working conditions with steady normal loads and perfect shaft alinement these slots will remain open and the coupling will function perfectly in the desired manner. Under extreme load, however, or suddenly applied loads the torque pressure upon the disc causes the slots to partially or wholly close and thereby supplement the resistance of the disc to meet the abnormal conditions. Where two shafts are connected through the coupling of the present invention and have parallel but not co-incident axes two of the slots 26 may close entirely while adjacent slots may be only partially closed. Where two shafts are connected through the coupling in angular misalinement the slots 26 on one side of the axis of the disc 23 will be closed and those on the opposite side of the axis will be open, and the disc itself will assume a more or less twisted shape. Furthermore the slots 26 should be short enough so that the strength of the leather or other material will be such that the slots remain open under normal driving torque and with perfect shaft alinement. Centrifugal force also tends to set up stresses which will keep the slots open.

In the form of the invention shown in Figures 6 and 7 a modified form of flexible disc 23 is employed but as the remaining structure of the coupling is unchanged except as to the number of the lugs 20 and 22 these parts are given the same reference numerals for like parts as in the previous figures. The disk 23, in this instance, is provided with a plurality of holes 27 between each pair of openings 25 and the holes 27 are arranged in radial alinement as will be seen from Fig. 6. These holes 27 serve the same purpose as the slots 26 in that greater motion of lateral bending is possible to compensate for shafts which are not in exact alinement.

In Fig. 8 a further modification of flexible driving disc 28 is shown wherein the periphery of the laminated disc is provided with a plurality of slots 30 which open into incomplete circular recesses 31 serving respectively to snugly seat about the lugs 20 and 21 in assembled condition. Thus the slots 30 provide between them radial members 32 which receive the driving thrust of the lugs.

In order to obtain the added flexibility necessary for carrying out the new results of the present invention these members 32 are provided with radially arranged slots 33, each being substantially coincident with the median radius line of each of the members 32.

While only three forms are shown in which the invention may be embodied, it is to be understood that the invention is not limited to any specific construction, but might be applied to various forms without departing from the spirit of the invention or the scope of the appended claims.

Having thus described my invention, I claim:

1. In a flexible coupling, a driving part for attachment to a driving shaft, a driven part for attachment to a driven shaft, a flexible disc interposed between said parts and having a plurality of openings, lugs on said driving part respectively fitting certain of said openings, lugs on said driven part respectively fitting the remaining openings and slots through said disc respectively between the pairs of openings for increasing the flexibility of said disc.

2. In a flexible coupling, a driving part for attachment to a driving shaft, a driven part for attachment to a driven shaft, a flexible disc interposed between said parts and having a plurality of openings, lugs on said driving part respectively fitting certain of said openings, lugs on said driven part respectively fitting the remaining openings and allowing free end play between said parts, and slots through said disc respectively between the lug encircling openings for increasing the flexibility of said disc.

3. In a flexible coupling, a driving member for attachment to a driving shaft, a driven member for attachment to a driven shaft, and a connecting member for transmitting power from said driving to said driven member, said connecting member having a portion of its cross-section removed to increase its flexibility, said members being so associated that each is free to move independently of the other in an axial direction.

4. In a flexible coupling, a driving member for attachment to a driving shaft, a driven member for attachment to a driven shaft, and a connecting disc for transmitting power from said driving to said driven member, said disc having a portion of its cross-section removed to increase its flexibility, said members and said connecting disc being so associated that each is free to move independently of the other in an axial direction.

5. In a flexible coupling, a driving member for attachment to a driving shaft, a driven member for attachment to a driven shaft, a connecting member for transmitting power from said driving member to said driven member, said connecting member being secured to said driving and driven members in the direction of rotation only and having a portion of its cross-section removed to increase its flexibility.

6. In a flexible coupling, a driving member for attachment to a driving shaft, a driven member for attachment to a driven shaft, a connecting member for transmitting power from said driving member to said driven member, said connecting member forming a positive connection for producing rotation from one member to the other member but free to move in an axial direction independently of said driving and driven members and having a portion of its cross-section removed to increase its flexibility.

7. In a flexible coupling, two sets of power transmitting lugs, means for connecting one set of said lugs to and parallel with a driving shaft, means for connecting the other set of lugs to and parallel with a driven shaft, said connecting means being so arranged that one set of lugs faces in the opposite direction to the other, a member having holes for respectively receiving said lugs for axial sliding movement relative to said member and for directly transmitting driving torque from one set of lugs through said member to the other set of lugs, said member having a portion of its cross-section removed between certain driving lugs and certain driven lugs for increasing the flexibility of said member.

ELLIS E. BROWN.